Oct. 24, 1961     W. M. McCONNELL     3,005,638
PIPE CHUCKS
Filed Nov. 24, 1959                           2 Sheets-Sheet 1
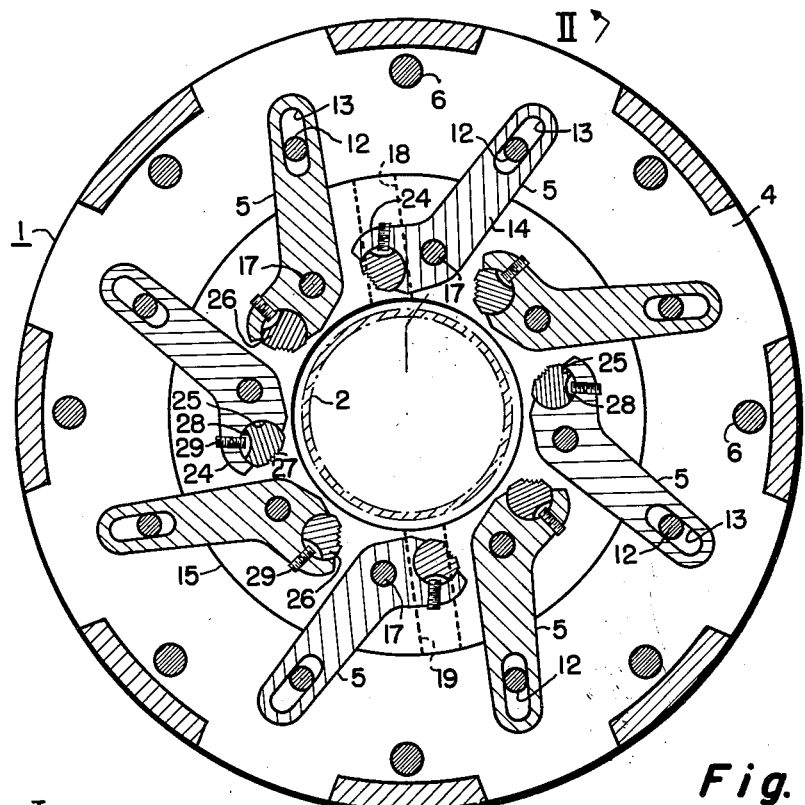
Fig. 1
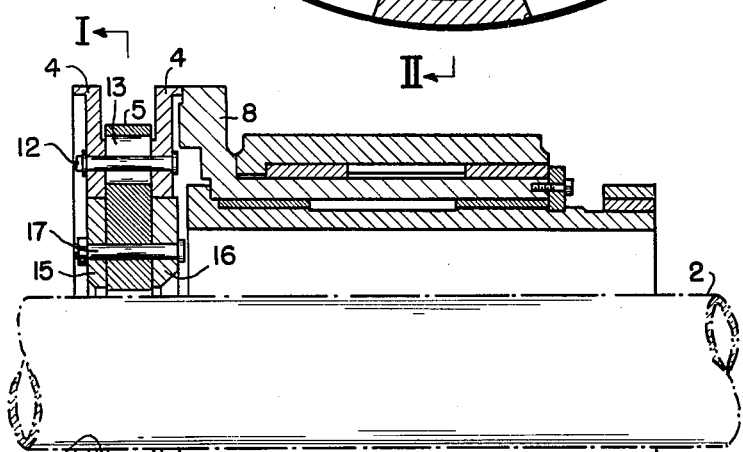
Fig. 2
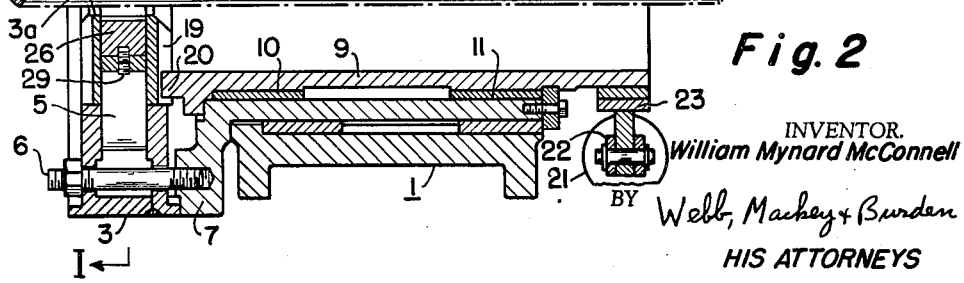
INVENTOR.
William Mynard McConnell
BY Webb, Mackey & Burden
HIS ATTORNEYS

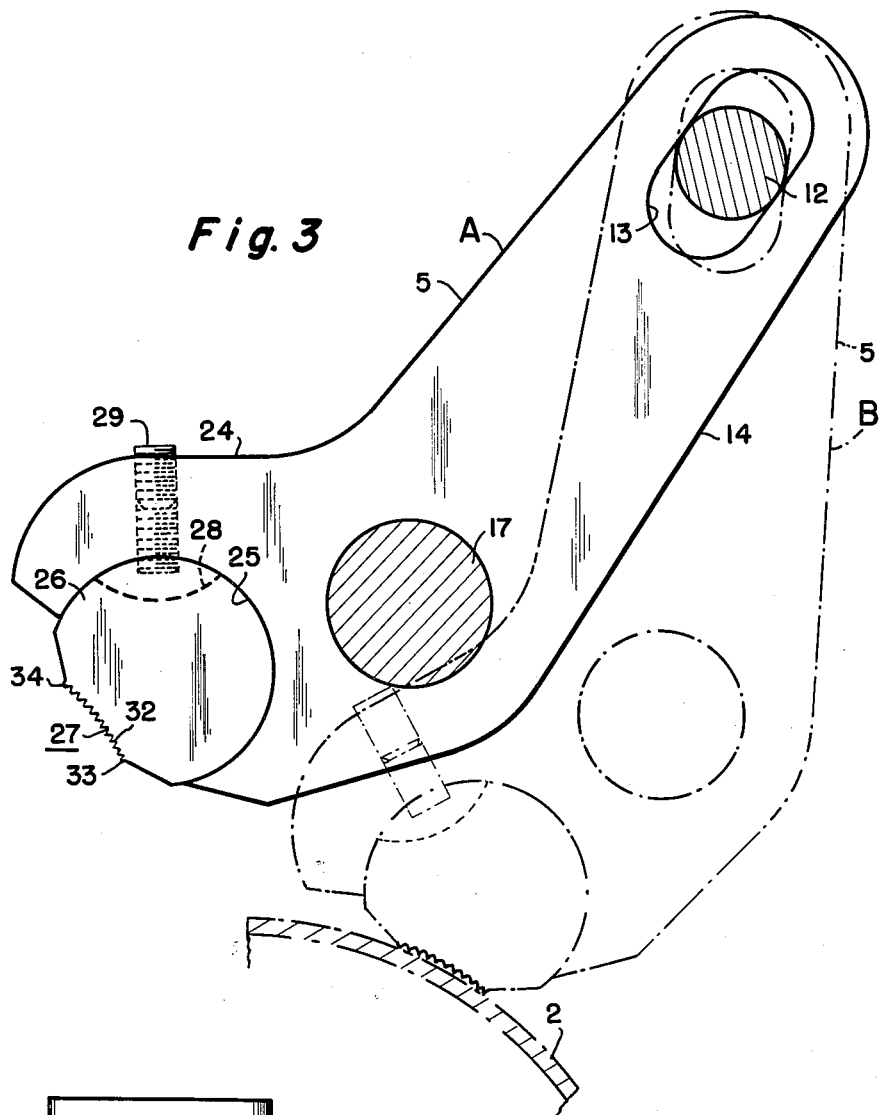
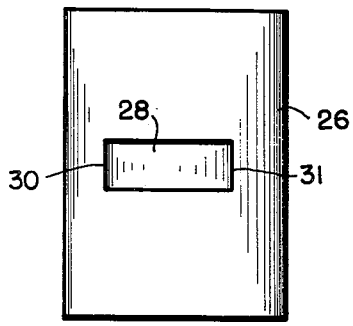

United States Patent Office 3,005,638
Patented Oct. 24, 1961

3,005,638
PIPE CHUCKS
William Mynard McConnell, Pittsburgh, Pa., assignor to Taylor-Wilson Manufacturing Company, Pittsburgh, Pa., a corporation of Pennsylvania
Filed Nov. 24, 1959, Ser. No. 855,034
2 Claims. (Cl. 279—106)

This invention relates to chucks or vices for gripping and supporting a workpiece such as a length of pipe or tubing which is to be hydraulically tested, which is to be threaded, to which a coupling is to be attached, etc. More particularly, it relates to a jaw for the chuck or vise and to a toggle type of chuck.

Heretofore, in tapering and threading ends of pipe or tubing, in hydraulically testing pipe, in attaching couplings to ends of pipe, and in performing other operations upon pipe or tubing, firm gripping and supporting of the pipe required use of chucks or vises with jaws having edges or teeth which bite deeply into the periphery of the pipe. Deep biting or marking of a pipe weakens its walls and produces a source of stress or strain which tends to open up and cause failure of the pipe in service. Failure of pipe in service is a serious problem, particularly in oil well drilling operations where lengths of pipe may be many thousands of feet down a well hole. Thus, should a pipe deep in the well hole fail, substantial costs are added to drilling operations to withdraw the pipe and to retrieve the drilling bits. Accordingly, users of pipe specify that depths or marks or cuts in pipe resulting from gripping the pipe in tapering, threading, testing and coupling attaching operations, etc. must not exceed a predetermined amount.

My invention provides a jaw for a chuck or vise which firmly grips and supports a workpiece such as a length of pipe without producing deep and objectionable marking or penetration of the pipe periphery. Specifically, I employ a jaw for a chuck which engages and supports a workpiece and which has a plurality of jaws adapted to be moved into and out of clamping engagement with the pipe. The jaw has a work part or head which is opposite the workpiece when the jaw is in clamping engagement therewith. The jaw also has a second part connected to the head and about which the jaw pivots when moved into and out of clamping engagement. The head has a socket therein for receiving in slidable rotative engagement therewith a disk which has a work surface on a first part of its periphery for engagement with the pipe. A second part of the periphery of the disk is in slidable engagement with that part of the jaw which defines the socket. Mountig of the disk in the socket is for limited, slidable, rotative movement between the disk and the jaw upon engagement of the disk with the workpiece. The work surface of the disk is located on the periphery thereof relative to the socket so that it contacts the workpiece when the jaw is moved into clamping engagement.

The socket defines a path of slidable rotative movement between the disk and the jaw so that the work surface of the disk moves into engagement with the workpiece when the disk contacts the workpiece.

The jaw has means positioned thereon for engagement with the disk to limit slidable rotative movement between the disk and the jaw.

The work surface of the disk extends along the periphery of the disk and is roughened. In some instances, the work surface comprises a plurality of shallow serrations running substantially parallel to the longitudinal axis of the workpiece when the jaw is in clamping engagement.

In the accompanying drawings I have shown a preferred embodiment of my invention in which:

FIGURE 1 is a section view along the line I—I of FIGURE 2 showing a chuck embodying my invention;

FIGURE 2 is a section view along the line II—II of FIGURE 1;

FIGURE 3 is a side elevation view of a jaw of the chuck of FIGURE 1 in clamped and unclamped position; and FIGURE 4 is a plan view of the disk of the jaw of FIGURE 3 showing a slot into which a set screw of the jaw extends.

Referring to the drawings, FIGURES 1 and 2 show a toggle type chuck or vise 1 with a length of pipe 2 disposed therein. The chuck comprises a substantially circular hollow cage or housing 3 having a central bore 3a extending therethrough for receiving the pipe. The cage has side walls 4 spaced apart and mounts a plurality of jaws 5 arranged about the central bore and movable into and out of clamping engagement with the pipe as will be described hereinafter. Bolts 6 connect the cage 3 to one end 7 of an outer barrel 8 which rotatably supports an inner barrel 9 upon bearings 10 and 11. The outer barrel 8 is so positioned relative to the cage 3 that the inner barrel 9 is aligned end to end with the bore of the cage whereby the pipe extends both through the inner barrel and the bore of the cage.

Pins 12 extending between the side walls 4 of the cage and through an elongated slot 13 in the shank part 14 of the jaws 5 mount each jaw in the cage 3.

The side walls 4 of the cage 3 support an outer ring 15 and an inner shifter ring 16 which straddle each jaw with the inner shifter ring being opposite the end of the outer barrel connected to the cage as shown in FIGURE 2. A bolt 17 extends through the jaw also supporting it and through the outer and inner shifter rings. The inner shifter ring has two spaced apart recesses 18 and 19 which receive a projection 20 of the inner barrel with one of the projections being shown in FIGURE 2.

A push-pull hydraulic or pneumatic cylinder 21 disposed transversely to the longitudinal axis of the inner barrel has its piston rod 22 connected to a lug 23 affixed to the inner barrel 9. Operation of the cylinder 21 rotates the inner barrel upon the bearings 10 and 11 through a small arc, thereby rotating the outer and inner shifter rings and the bolt 17 through a short arc. Rotation of the outer and inner rings and the bolt 17 causes the jaws 5 to pivot about pins 12 and move into and out of clamping engagement with the pipe. Viewing FIGURE 1, rotation of the inner barrel brings about a clockwise or counterclockwise pivot of the jaws and rotation of the inner and outer rings.

As shown in FIGURE 3, position A represents a jaw in unclamped or unchucked position and out of engagement with the pipe and position B represents the jaw in clamped or chuck position in gripping engagement with the pipe. Viewing FIGURE 1, movement of the outer and inner rings in a clockwise direction effects closing or clamping the chuck and movement in a counterclockwise direction opens or unclamps the chuck. In moving from closed to open position or vice versa, the jaw 5 of FIGURE 3 travels through an arc of about 21°.

Each jaw 5 has a head 24 which is opposite the periphery of the pipe when the jaw is in clamping engagement therewith. The head has an arcuate socket 25 which mounts therein a disk 26 for slidable rotative movement between it and the jaw when the jaw is brought into engagement with the pipe. The disk has a work surface 27 on a first part of its periphery and a second part of its periphery is in slidable engagement with the surface of the socket. The socket 25 defines a path for slidable rotative movement between the disk and the jaw so that the work surface 27 moves into engagement with the pipe when the disk contacts the pipe.

The disk has a depression or recess 28 extending along the part of the periphery which is disposed within the socket (FIGURES 1, 3–4). A set screw 29 carried by the head extends down into the depression and limits slidable rotative movement between the disk and the jaw by engaging ends 30 and 31 of the depression upon slidable rotative movement between the disk and the jaw.

That part of the head having the socket extends more than 180° around the disk, thereby preventing it from falling out of the socket. The disk is placed into the socket by simply positioning the disk and jaw in parallel planes and then inserting the disk into the socket with the set screw withdrawn from extension into the socket. Once the disk is located in the socket, the set screw is entered into the depression 28, thus insuring that the disk remains in the socket during opening and closing of the chuck.

The work surface 27 of the disk is a part of the periphery of the disk and is not disposed within the socket. It extends along a part of the periphery of the disk and is roughened to provide good gripping ability with the pipe without producing objectionable or serious marking or biting of the pipe surface. As shown in FIGURE 3, the work surface has a plurality of shallow serrations 32 extending transversely across the peripheral surface of the disk from one side to the other side thereof. Also the work surface 27 is concave and comprises an arc of a circle; however, the work surface need not be concave but can be convex or lie in a plane tangent to the periphery of a length of pipe. Preferably, when the jaws are in clamping engagement with the pipe, there is contact between the pipe and the work surface along a substantial part, if not all, of the length of the work surface. Where the pipe has a radius greater than the radius of the arc which comprises the work surface, the end parts of the work surface engage the periphery of the pipe with the center part of the work surface spaced apart therefrom. Where the pipe has a radius less than the radius of the arc which comprises the work surface, the center part of the work surface engages the periphery of the pipe with the end parts being spaced apart therefrom.

My chuck with the jaws having the disk disposed in each head thereof has ability to adjust itself for firm gripping of different diameter pipe without causing objectionable marking or cutting of the pipe surface. Furthermore, the chuck can adjust itself to generate the amount of gripping force required to resist a torque applied to a length of pipe clamped by the chuck. Ability to adjust itself to resist torque applied to the pipe results from use of the disks and from provision for limited movement of each disk in its socket mounting. When the jaws are moved from unchucked into chucked or clamping position, the disk of each jaw is positioned upon contact with the pipe so that the work surface engages the pipe along all or substantially all of its length. Positioning of the disk to bring the work surface into engagement with the pipe usually results from engagement by a small portion of the work surface of the disk, usually one or a few of the shallow serrations of the work surface followed by slidable rotative movement between the disk and the jaw to bring all or substantially all of the work surface into contact with the pipe. Such slidable rotative movement may be a clockwise travel of the jaw with a simultaneous counterclockwise movement of the disk, viewing FIGURE 1. This occurs when the leading part 33 of the work surface contacts the pipe before the rest of the work surface as the jaw travels from unclamped to clamped position. When this happens, the leading part 33 in impingement with the pipe causes the disk to rotate counterclockwise to bring the balance of the work surface into engagement with the pipe as the jaw moves in a clockwise arc. Counterclockwise movement of the disk accompanied by clockwise movement of the jaw usually happens when the pipe diameter about to be gripped is greater than the preceding one.

Where the pipe diameter about to be gripped is smaller than the preceding one, there may be a clockwise movement of the disk while at the same time, there is a clockwise movement of the jaw. This occurs when the trailing part 34 of the work surface impinges upon the pipe before the balance of the work surface. When this happens, the trailing part in engagement with the pipe causes the disk to rotate clockwise to bring the balance of the work surface into engagement with the pipe as the jaw pivots about the pin 12 and moves through a clockwise arc in traveling into clamping position.

Where, however, the work surface is so located relative to the pipe that upon moving the jaw from unclamped to clamped position all or substantially all of the work surface engages the pipe, there is no rotative movement between the disk and the jaw. This generally occurs when the pipe about to be gripped has the same diameter as the preceding pipe.

My invention has important advantages in that the jaws are self-adjusting to accommodate themselves to different diameter pipe with firm and secure gripping thereof. Also, the work surface of my disks which extend along a periphery thereof and which have a roughened surface or shallow serrations do not produce objectionable or serious marking or cutting of the pipe walls, thus avoiding weakening of the walls and generation of sources of stress which may result in failure of the pipe in service.

While I have shown and described a preferred embodiment of my invention, it may be otherwise embodied within the scope of the appended claims.

I claim:

1. In a toggle type chuck having a housing the combination comprising, a plurality of jaws disposed in said housing, pivot means in said housing in engagement with each of said jaws and forming a pivot about which said jaws move in their travel into and out of gripping engagement with a substantially cylindrical workpiece, a shiftable member in engagement with said jaws and operably connected to cooperating means for causing said jaws to travel into and out of engagement with said workpiece, each of said jaws having a work part which is opposite the workpiece when the jaw is in clamping engagement therewith and a second part connected to said work part and in engagement with said pivot means, said work part having a socket therein, a disk having a work surface extending along a first part of its periphery for engagement with said workpiece and being mounted in said socket with a second part of its periphery in slidable engagement with that part of said jaw defining said socket, said socket defining a path of slidable rotative movement between the disk and the jaw upon engagement of the disk with the workpiece, said work surface being located on that part of the periphery of said disk substantially opposite said workpiece and being concave to provide an area of contact with the periphery of said workpiece, means carried by said jaw and positioned thereon for engagement with said disk to limit slidable rotative movement between the disk and the jaw.

2. The combination of claim 1 characterized by said work surface having a plurality of shallow serrations running substantially transversely thereof.

References Cited in the file of this patent

UNITED STATES PATENTS

| | | |
|---|---|---|
| 2,460,254 | Greer | Jan. 25, 1949 |
| 2,479,560 | Eaton | Aug. 23, 1949 |
| 2,523,374 | Jensen | Sept. 26, 1950 |
| 2,693,365 | Von Zelewsky | Nov. 2, 1954 |
| 2,778,652 | Ingwer | Jan. 22, 1957 |
| 2,936,922 | Vermette | Mar. 1, 1960 |